(12) United States Patent
Ankenman

(10) Patent No.: US 6,397,953 B1
(45) Date of Patent: Jun. 4, 2002

(54) FLOATING HITCH FOR AGRICULTURAL IMPLEMENT

(75) Inventor: Thomas W. Ankenman, Hutchinson, KS (US)

(73) Assignee: Krause Plow Corporation, Hutchinson, KS (US)

( * ) Notice: Subject to any disclaimer, the term of this patent is extended or adjusted under 35 U.S.C. 154(b) by 0 days.

(21) Appl. No.: 09/740,449

(22) Filed: Dec. 19, 2000

(51) Int. Cl.[7] ............................................. A01B 59/043
(52) U.S. Cl. ..................................................... 172/445.1
(58) Field of Search ................................. 172/310, 311, 172/328, 318, 327, 400, 413, 448, 445.1, 449, 396, 274, 677–679; 280/414.5, 438.1, 481

(56) References Cited

U.S. PATENT DOCUMENTS

| | | | |
|---|---|---|---|
| 3,583,284 A | * | 6/1971 | Ryan ........................... 91/189 |
| 3,830,313 A | | 8/1974 | Frager et al. |
| 3,918,529 A | | 11/1975 | Frager et al. |
| 4,232,747 A | | 11/1980 | Pfenninger et al. |
| 4,286,672 A | * | 9/1981 | Forsyth et al. .............. 172/311 |
| 5,232,054 A | * | 8/1993 | Van Blaricon et al. ..... 172/311 |
| 5,450,908 A | | 9/1995 | Hagman et al. |
| 6,035,943 A | | 3/2000 | Gerein et al. |

OTHER PUBLICATIONS

Wil–Rich Quad–5 Brochure (W14–1087–10M–JM–7/92) Cover and 3 additional pages.

* cited by examiner

Primary Examiner—Robert E. Pezzuto
(74) Attorney, Agent, or Firm—Hovey Williams LLP

(57) ABSTRACT

The implement has a main frame supported at the rear by ground-engaging transport wheels and at the front by ground-engaging gauge wheels. A hitch is pivotally connected to the front end of the main frame so that the hitch and frame can flex relative to one another when the towing tractor experiences different terrain than the main frame. A self-leveling mechanism is normally disengaged when the implement is in its field operating position so that the hitch is free to float relative to the frame during terrain changes. However, when engaged, the self-leveling mechanism operates to maintain the main frame level as the transport wheels are lowered to raise the main frame into its transport position. A latch, remotely actuatable from the tractor seat, determines whether the implement is in its self-leveling mode or floating hitch mode.

8 Claims, 7 Drawing Sheets

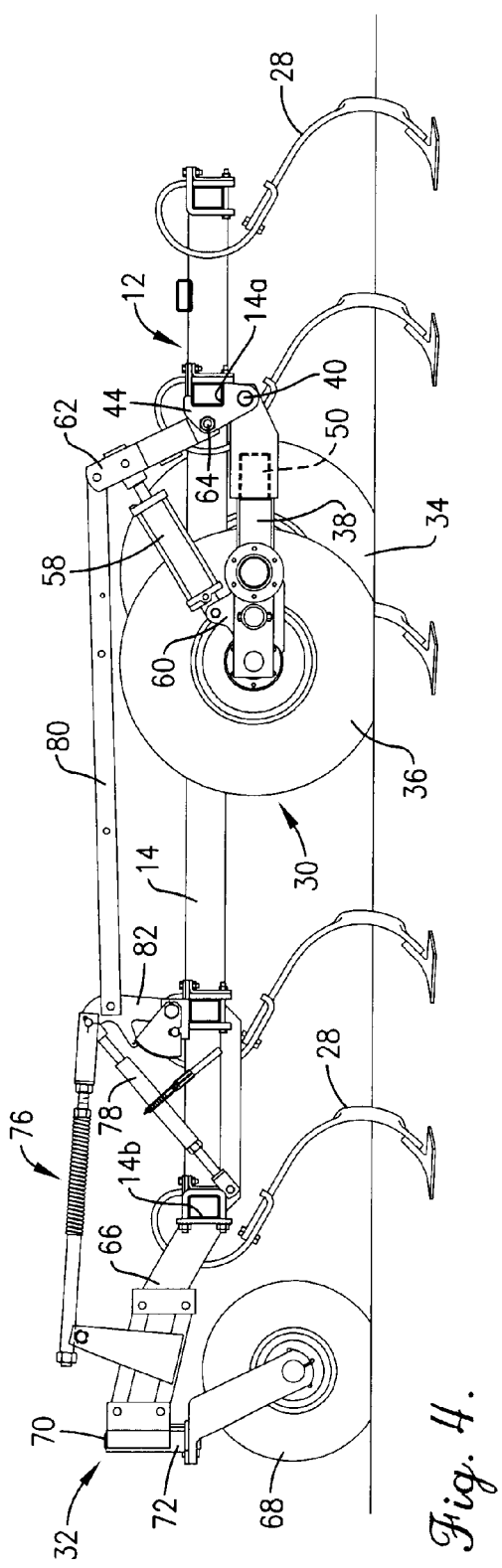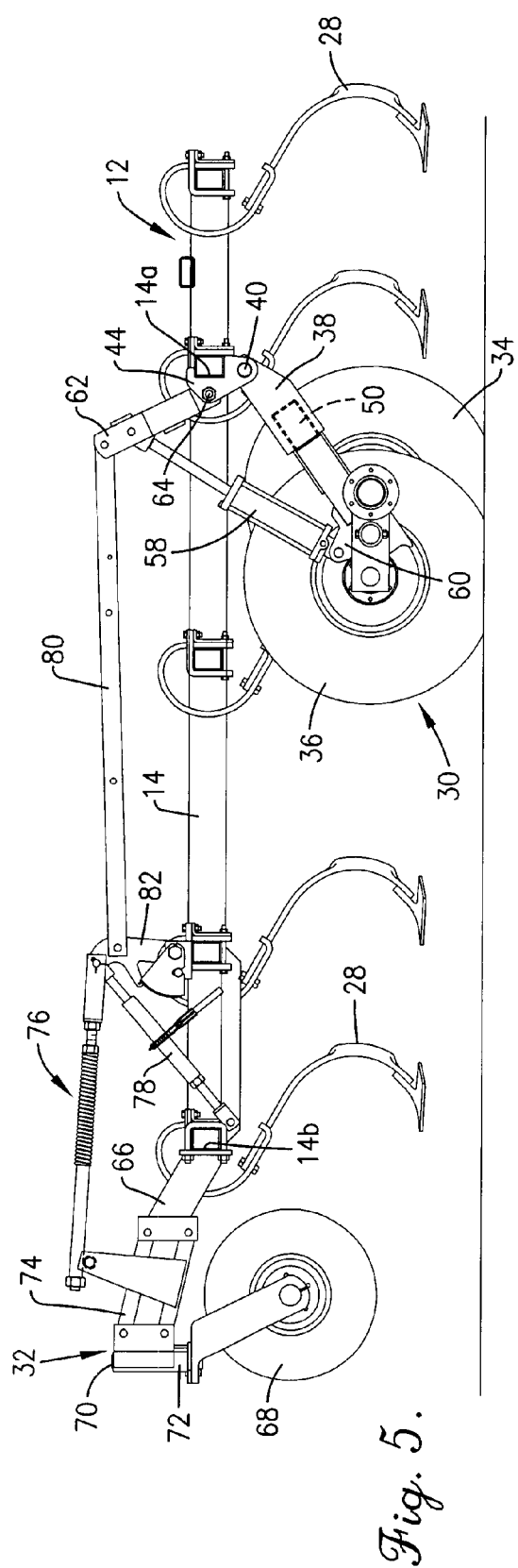
Fig. 4.
Fig. 5.

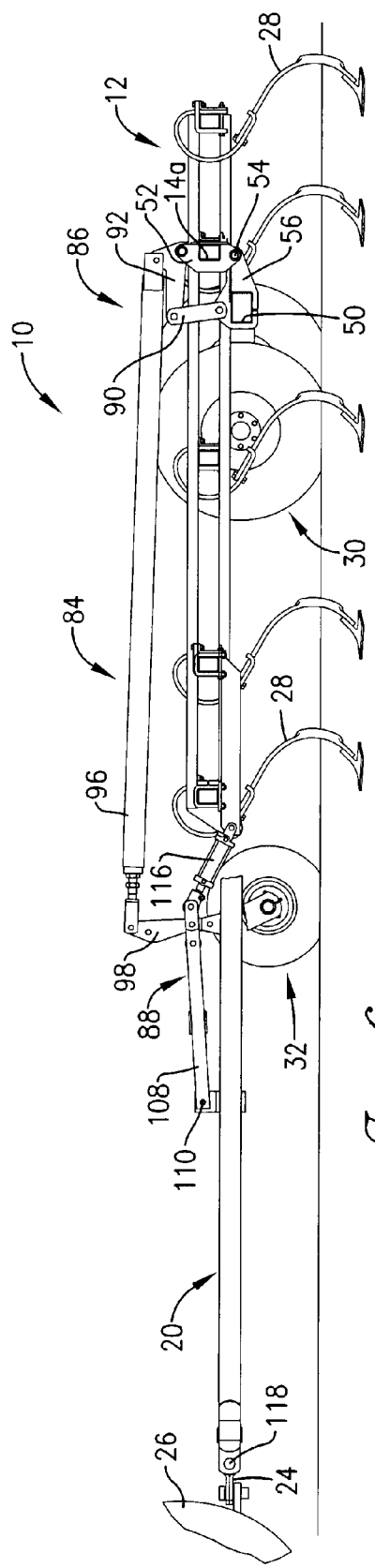
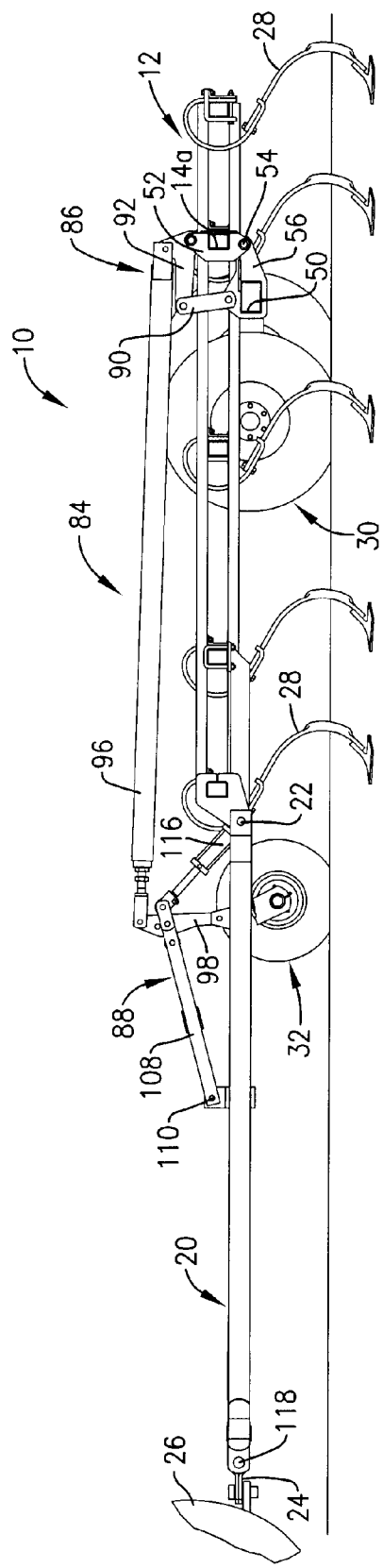

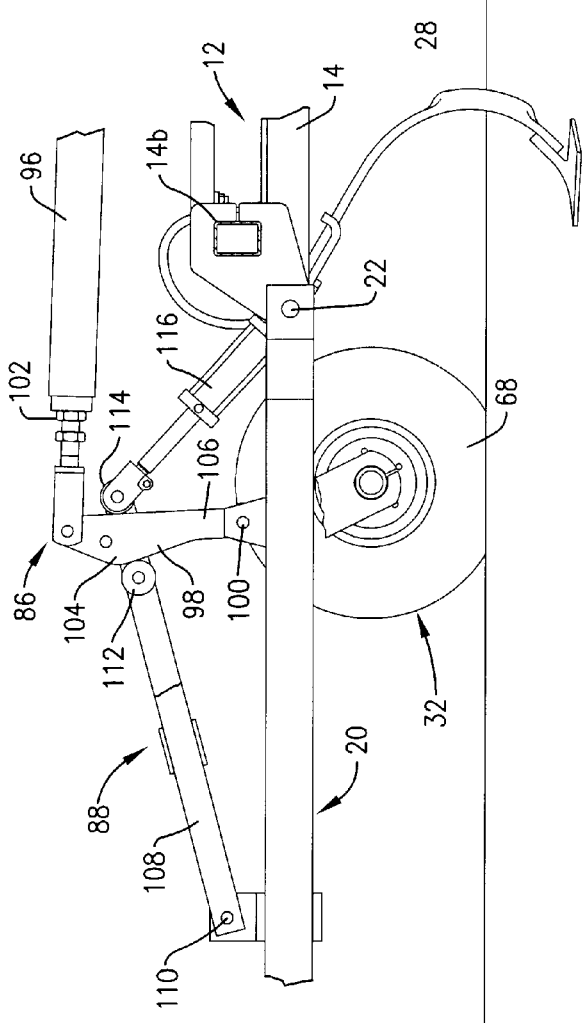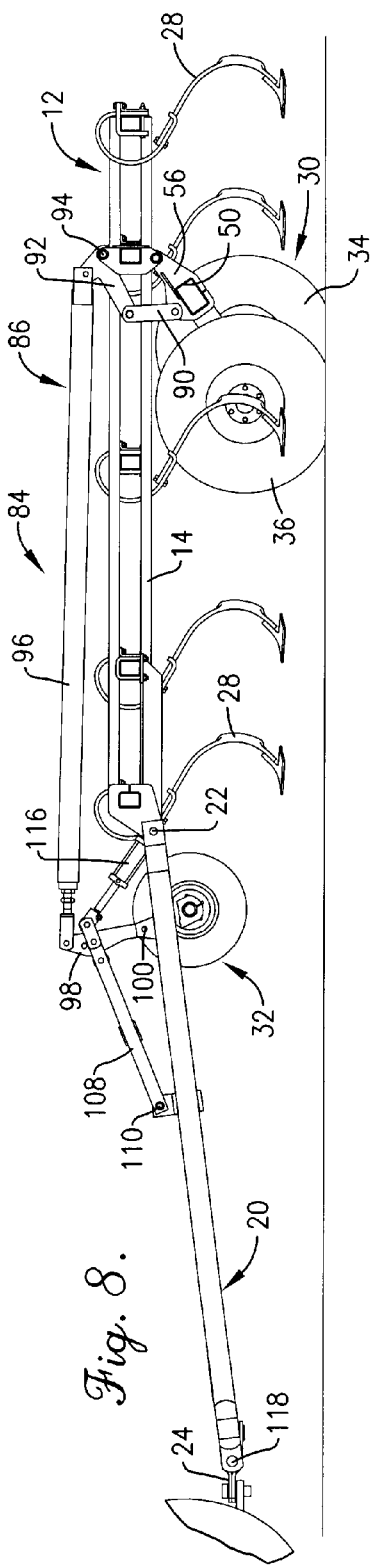

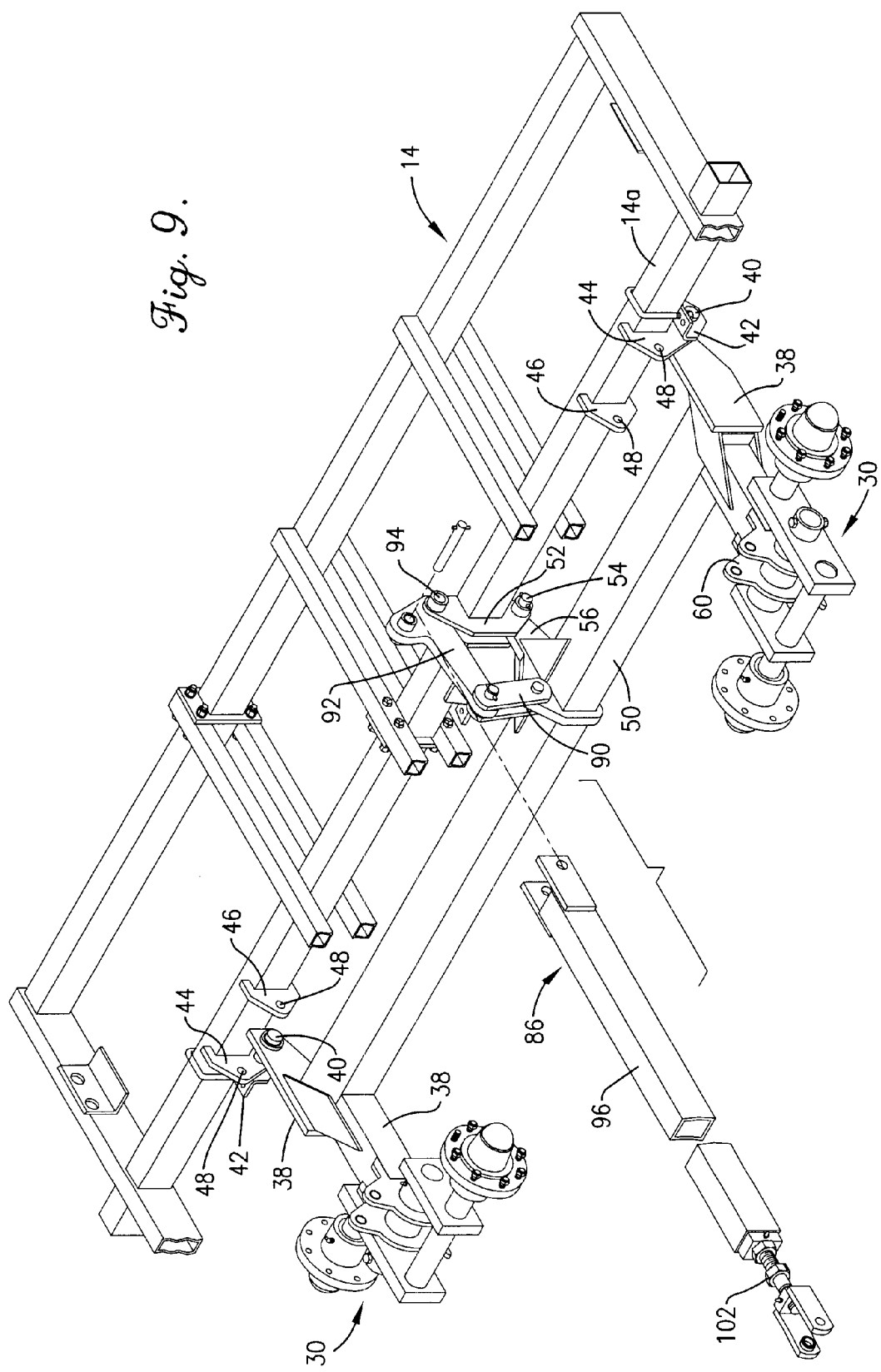

FLOATING HITCH FOR AGRICULTURAL IMPLEMENT

TECHNICAL FIELD

The present invention relates to farm implements and, more particularly, to tillage implements and like devices in which it is important to penetrate the soil at a uniform depth in all regions of the implement regardless of changes in terrain that may be encountered between the towing vehicle and the implement.

BACKGROUND

Tillage implements such as field cultivators typically have relatively large rectangular frames that have a significant front-to-rear dimension. In order to have the ground penetrating tools of the frame at the same depth in both the front and rear, it is a fairly common practice to utilize gauge wheels at the front of the main frame to assist the main transport wheels that are positioned further back toward the rear of the frame. By having both the transport and gauge wheels engaging the ground when the main frame is at its lowered, operating position, the main frame can remain substantially level as the towing tractor encounters terrain changes not yet experienced by the implement. A transverse horizontal pivot between the main frame and the tongue or hitch allows the hitch to float up and down about the transverse pivot as the tractor and main frame seek their own level conditions.

In known floating hitch arrangements, the hitch is in a floating mode at all times. When the main frame is raised into a transport position, the gauge wheels remain on the ground along with the main transport wheels. Thus, the gauge wheels remain in contact with the ground during over-the-road travel, which is not a desirable situation because the gauge wheels are typically of the castering variety and tend to wobble and gyrate back and forth at road speeds unless somehow locked in straight ahead positions. Furthermore, since the linkages that connect the gauge wheels to the main frame must be operated each time the main frame is raised and lowered, such linkages will suffer premature wear unless they are heavy duty components, which necessarily increases costs.

Yet, it is important to keep the main frame substantially level when in its transport position so that adequate ground clearance is achieved between the tools and the ground at all regions of the machine. On known equipment, unless the gauge wheels remain in contact with the ground at such time, the unsupported front end of the main frame can nose dive about the transverse flotation pivot. What is needed in the art is a way of keeping the main frame level in the transport position even though the gauge wheels are off the ground, yet allow the main frame to remain level in the field position while the hitch floats up and down as the tractor experiences changes in terrain relative to the main frame.

SUMMARY OF THE INVENTION

The present invention contemplates overcoming the deficiencies of the prior art by providing a floating hitch arrangement that can be selectively engaged and disengaged. Thus, in the field operating position, the hitch can be disposed in a floating mode in which it is free to swing up and down relative to the main frame as the gauge wheels and transport wheels maintain the main frame in a level attitude. Then, for transport, the hitch can be locked into a self-leveling mode with the main frame such that as the main frame is raised and lowered, carrying the gauge wheels therewith, the angular position of the hitch relative to the main frame is under the control of self-leveling mechanism that causes the main frame to remain level in all positions of vertical adjustment.

The self-leveling mechanism includes linkage that transmits motion of the transport wheel arms to the hitch when the self-leveling mechanism is engaged for transport. On the other hand, when the self-leveling mechanism is disengaged for field operations, there is no motion-transmitting connection between the wheel arms and the hitch such that the hitch can freely pivot up and down while the wheel arms remain in a fixed position relative to the main frame. A latch carried on the hitch can be locked and unlocked to correspondingly engage and disengage the self-leveling mechanism, and in a preferred form of the invention such latch includes a remotely actuatable hydraulic piston and cylinder assembly so that the self-leveling mechanism can be engaged and disengaged from the tractor seat. When the latch is disengaged, an upstanding lever pivoted to the hitch and forming part of the control linkage of the self-leveling mechanism is free to swing back and forth relative to the hitch as the hitch floats with terrain changes. On the other hand, when the latch is engaged, the lever is locked up and cannot swing relative to the hitch such that movement of the wheel arms to raise and lower the main frame is correspondingly transmitted to the hitch, causing invention, a strut that maintains the lever rigid to the hitch when the self-leveling mechanism is engaged has one end that can move up and down along the lever between locking and released positions. The lever has a certain amount of lost motion relative to the strut when the strut is in its released position, but when the strut is in the latched position the lever is immobilized relative to the hitch. The gauge wheels are linked mechanically to the transport wheel assemblies in such a way that, even though the transport wheels are hydraulically swung up and down relative to the main frame during adjustment of the main frame between its operating and transport positions, the gauge wheels remain at a constant position and thus are raised off the ground when the main frame is raised. On the other hand, when the gauge wheels are depth adjusted relative to the main frame, the linkage between the gauge wheels and the transport wheel assemblies responsively causes a corresponding amount of depth adjustment of the transport wheels as well.

BRIEF DESCRIPTION OF THE DRAWINGS

FIG. 1a is an enlarged, fragmentary elevational view of the implement illustrating the floating action of the hitch;

FIG. 4 is a generally fore-and-aft cross sectional view through the implement with the main frame in the operating position and taken substantially along line 4—4 of FIG. 3;

FIG. 5 is a elevational view of the implement substantially similar to FIG. 4 but showing the main frame raised into its transport position;

FIG. 6 is a generally fore-and-aft cross sectional view of the implement in the operating position with the self-leveling mechanism disengaged to permit free floating action by the hitch and taken substantially along line 6—6 of FIG. 3;

FIG. 7 is a cross sectional view of the implement similar to FIG. 6 with the main frame in the field working position but showing the self-leveling mechanism engaged in preparation for raising of the main frame into the transport position;

FIG. 7a is an enlarged, fragmentary view of the implement in its FIG. 7 position illustrating details of construction of the latch for locking the self-leveling mechanism in its engaged condition;

FIG. 8 shows the self-leveling mechanism engaged and the main frame raised up into its transport position; and FIG. 9 is an isometric, partially exploded view of portions of the center frame section of the implement illustrating details of construction.

DETAILED DESCRIPTION

The implement 10 selected for illustration is a field cultivator. However, as well understood by those skilled in the art, the principles of the present invention may be applied to many different kinds of implements, the field cultivator being but one example. Furthermore, it will be apparent that the principles of the present invention may be applied beneficially to single frame section implements or multiple frame section implements alike, the presence or absence of such folding wing sections and the number thereof being irrelevant to the principles of the present invention. It will be recognized, however, that in some respects the more wing sections provided in the implement, the greater the benefit achieved by the present invention. In the illustrated embodiment, a multiple frame section implement is disclosed as shown in FIG. 3 wherein the main frame 12 is shown to include a center frame section 14 and at least a pair of wing sections 16 and 18 hingedly connected to center section 14 in a well known manner.

Figure 3:
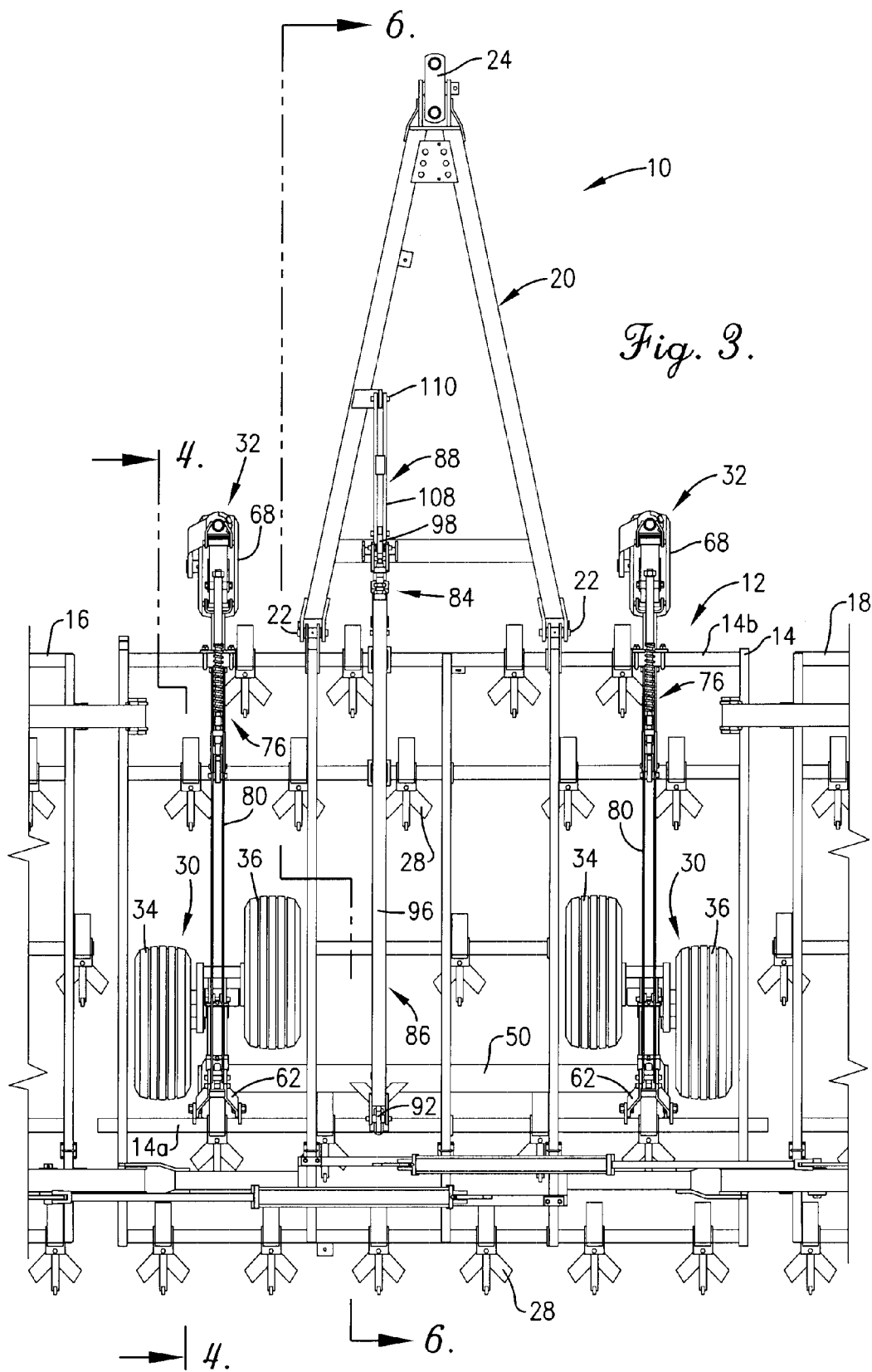
FIG. 3 is a fragmentary top plan view of the implement with its wing sections fragmentarily shown.

Center section 14 of main frame 12 is generally rectangular in plan as shown in FIG. 3. A generally triangular hitch 20 is pivotally connected to the front of center section 14 by a pair of horizontal, transverse, aligned pivots 22 that define an axis of vertical swinging movement of the hitch 20 relative to frame 12, and vice versa. A draw bar coupling 24 is provided at the front end of hitch 20 for connecting implement 10 to a towing tractor 26 or other vehicle. A number of tillage tools 28 in the form of shanks or tines are mounted on frame section 14 for penetrating the ground as implement 10 is drawn by tractor 26.

A pair of transport wheel assemblies 30 support the rear of frame section 14, while a pair of gauge wheel assemblies 32 support the front of frame section 14. Each transport wheel assembly 30 includes a pair of ground wheels 34 and 36 that are slightly mutually staggered in a fore-and-aft direction and comprise part of a walking beam arrangement as well known by those skilled in the art.

As shown particularly in FIGS. 4, 5 and 9, each transport wheel assembly 30 includes a wheel arm 38 supporting the wheels 34 and 36 at its lower end and pivotally attached at its upper end to the center frame section 14 via a transverse pivot 40. As shown in FIG. 9, each pivot 40 is supported by a bolt on bracket 42 and a welded on bracket 44, both of which are attached to and supported by a cross beam 14a of the center frame section 14. A second welded on bracket 46 is spaced inboard from each bracket 44 along the beam 14a, each pair of brackets 44,46 having a pair of transversely aligned holes 48 (FIG. 9) for a purpose yet-to-be described.

The two wheel arms 38 are rigidly interconnected by a transversely extending rocker bar 50 that extends parallel to but in front of and below the frame beam 14a. A generally centrally disposed bracket 52 on beam 14a (FIGS. 6, 7, 8 and 9) has a lower pivot 54 that swingably supports a lug 56 fixed to and projecting rearwardly from the rocker bar 50. Thus, bracket 52 provides central support for the rocker bar 50 during up and down movement thereof with the wheel arms 38.

Wheel arms 38 are raised and lowered relative to the center frame section 14 by hydraulic cylinders 58 (FIGS. 4 and 5). Each cylinder 58 has its anchor end pivotally attached to a lug 60 adjacent the lower end of wheel arm 38 and its upper rod end pivotally secured to an inverted, generally Y-shaped lug or fork 62. Each fork 62 is, in turn, pivotally attached at its lower end to a corresponding pair of the brackets 44,46 by aligned transverse pivot bolts 64 held in the aligned holes 48 in brackets 44,46 (FIG. 9). Forks 62, although being pivotally attached to the center frame section 14, are rendered immobile and effectively fixed with respect to the frame section 14 most of the time, as will hereinafter be explained in more detail. Accordingly, extension and retraction of wheel cylinders 58 causes vertical adjustment of transport wheel assemblies 30 relative to implement main frame 12.

Each gauge wheel assembly 32 is attached to the front of center section 14 by an upwardly and forwardly projecting mount 66 fixed at its lower end to a cross beam 14b of center frame section 14. Each gauge wheel assembly 32 includes a caster wheel 68 having an upright spindle 70 captured within a sleeve 72 for swiveling movement about an upright axis in a known manner. Sleeve 72 is in turn coupled with the mount 66 via a parallel linkage 74 for up and down adjusting movement relative to center frame section 14. A depth control apparatus 76 of known construction is coupled between the center section 14 and gauge wheel assembly 32 for adjusting the latter up and down relative to frame section 14 and for holding the same in a selected position of vertical adjustment, thus controlling the depth of penetration of the tools 28 at the front of frame section 14. Depth control apparatus 76 includes a ratchet jack 78 that maybe manually operated when adjustment of the gauge wheel assembly 32 is desired.

A rigid, fore-and-aft extending link 80 for each gauge assembly 32 and transport wheel assembly 30 is connected between the fork 62 of transport wheel assembly 30 and an upright member 82 of depth control apparatus 76. Consequently, ratchet jack 78 normally holds the corresponding gauge wheel assembly 32 and fork 62 immobilized relative to center frame section 14. However, when ratchet jack 78 is operated to vertically adjust gauge wheel assembly 32 for depth control purposes, a corresponding adjustment of fork 62 occurs, thus correspondingly causing depth adjustment of the transport wheel assembly 30. It will be noted in this respect that adjustment of the angular position of the fork 62 by depth control apparatus 76 has the effect of changing the height of the frame section 14 above the ground when the implement is in its lowered operating position of FIG. 4, as well as when it is in its raised, transport position of FIG. 5. It is contemplated that cylinder 58 will be fully retracted when the implement is in the working position of FIG. 4, and fully extended when in the transport position of FIG. 5.

In accordance with the present invention, implement 10 may be selectively placed in either a self-leveling mode or a floating hitch mode. In the preferred embodiment, such selection of modes is accomplished remotely from the driver's seat of tractor 26. Selectively engageable and disengageable self-leveling mechanism for providing this feature is denoted generally by the numeral 84 and broadly includes a motion-transmitting linkage leading from the transport wheel assemblies 30 of center section 14 to hitch 20 and a selectively actuatable latch 88 for selectively locking the linkage 86 in the self-leveling mode. When linkage 86 is unlocked, implement 10 is disposed in its floating hitch mode in which main frame 12 and hitch 20 can flex relative to one another about the horizontal transverse axis defined by pivots 22.

Beginning at the rear of the machine, and with initial reference to FIG. 9, it will be seen that linkage 86 includes a generally upright link 90 pivotally connected at its lower end to rocker bar 50, a somewhat reversely L-shaped bell crank 92 pivoted to the upper end of the bracket 52 by a pivot 94, a rigid, fore-and-aft extending link 96 connected to the upwardly projecting leg of bell crank 92, and a generally upstanding lever 98 (FIGS. 1a and 2a) connected to link 96 at its forwardmost end. Lever 98 is connected to hitch 20 by a pivot 100 for fore-and-aft swinging movement. The link 96 may be longitudinally adjusted somewhat using adjusting nuts 102 which function in a manner well understood by those skilled in the art. The width of lever 98 varies in a fore-and-aft direction, tapering from a wide portion 104 generally adjacent its upper end to a narrow portion 106 adjacent its lower end.

Latch 88 includes a strut 108 connected at its forward end by a pivot 110 to hitch 20 so that strut 108 can swing up and down relative to hitch 20. Adjacent its rearmost end, strut 108 is provided with a pair of limit rollers 112 and 114 that are spaced apart in a fore-and-aft direction and are disposed on opposite fore-and-aft sides of lever 98. The distance between rollers 112 and 114 generally corresponds to the fore-and-aft width of lever 98 in its wide portion 104. Thus, when strut 108 is in its lowered position of FIGS. 1, 1a, 2, 2a and 6 corresponding to a deactuated condition of latch 88, lever 98 is free to rock back and forth in a lost motion manner between the limits presented by rollers 112, 114 as may be seen by comparing FIGS. 1, 1a and 2, 2a. On the other hand, when strut 108 is in its raised position of FIGS. 7, 7a and 8 corresponding to the actuated condition of latch 88, rollers 112 and 114 are disposed closely adjacent front and rear extremities of lever 98 in wide portion 104 thereof so as to preclude any swinging motion of lever 98 relative to hitch 20.

Although a variety of means may be utilized to actuate and deactuate latch 88, in the preferred embodiment a hydraulic cylinder 116, operable from the tractor seat, is utilized for that purpose. Cylinder 116 is pivotally connected between the front end of center frame section 14 on the one hand and the rearmost extremity of strut 108 in the vicinity of roller 114 on the other hand. For convenience, latch cylinder 116 and wheel lift cylinders 58 may be connected in the same hydraulic circuit controlled by the same operating lever (not shown) at the tractor seat. Although connecting latch cylinder 116 and wheel cylinders 58 in a continuously parallel fluid flow relationship will work, best results have been obtained when a sequencing valve (not shown) is made a part of the parallel fluid flow circuit to assure that latch cylinder 116 always extends (to actuate to latch 88) before wheel cylinders 58 extend to raise the implement. Likewise, during lowering of the implement from its transport position of FIGS. 5 and 8, the sequencing valve assures that latch cylinder 116 will only retract (to deactuate latch 88) after wheel cylinders 58 have first been fully retracted and the implement is lowered back down to its working position of FIGS. 1, 1a, 2, 2a, 4 and 6. The sequencing valve itself forms no part of the present invention per se and is readily available as an off-the-shelf item to those skilled in the art. One suitable sequencing valve is available from Prince

Figure 1:
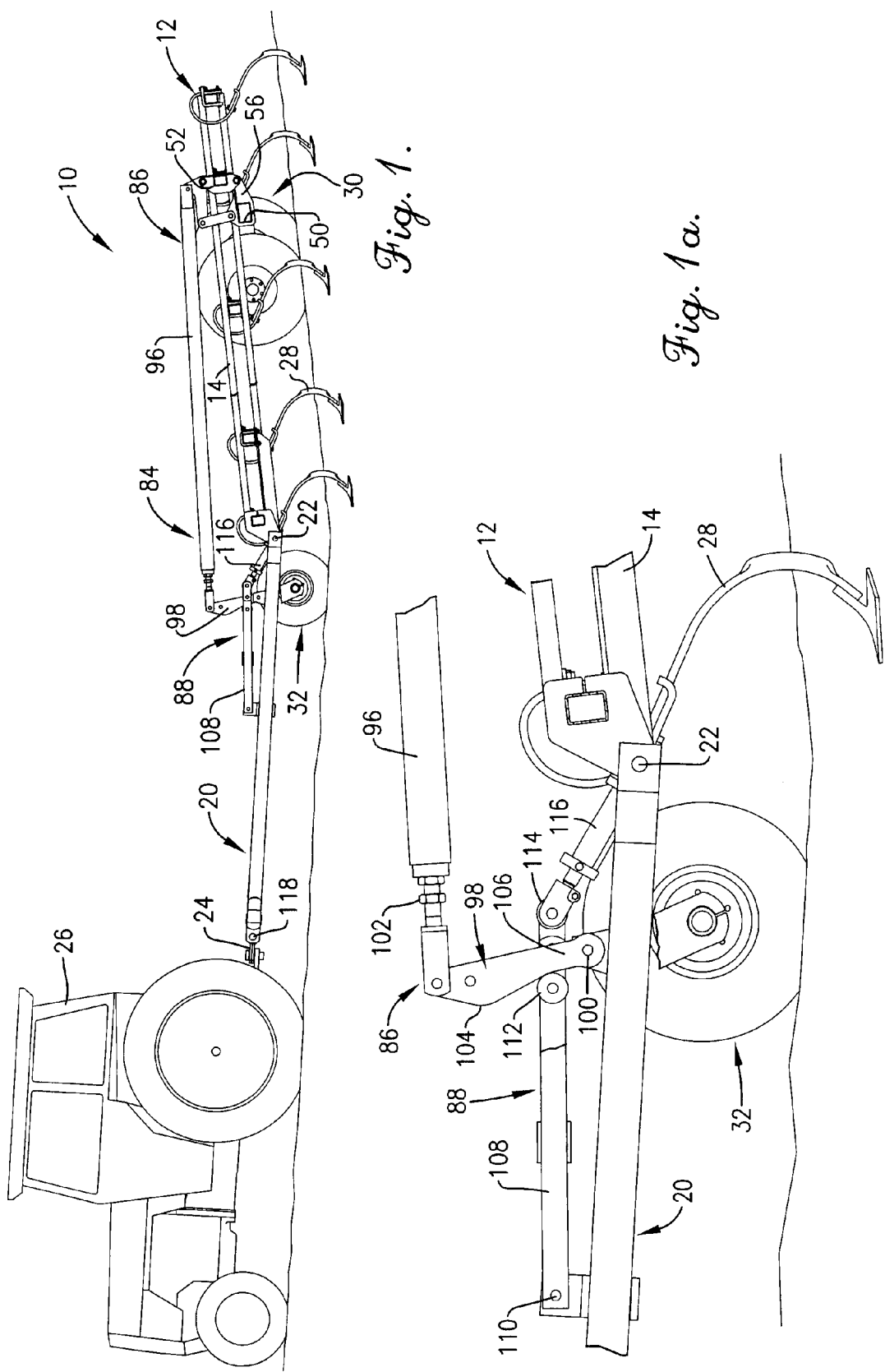
FIG. 1 is a side elevational view of an implement incorporating the principles of the present invention connected to a towing tractor and illustrating the nature of the floating hitch, portions of the implement being removed for clarity.
Figures 2, 2A:
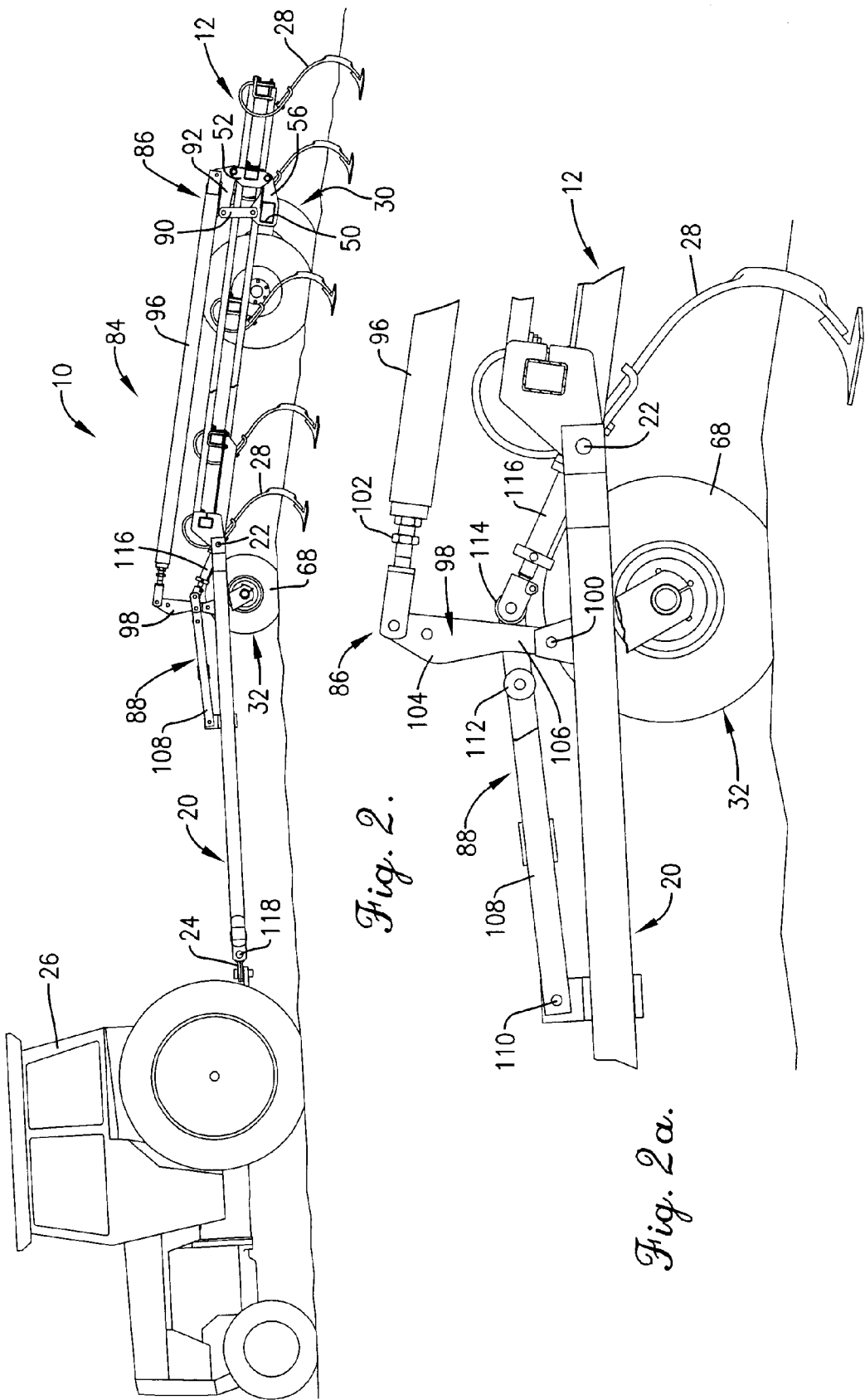
FIG. 2 is a side elevational view similar to FIG. 1 but illustrating the floating action of the hitch as the implement moves over a rise relative to the tractor.
FIG. 2a is an enlarged, fragmentary view thereof.

OPERATION:

During field operations, implement 10 is operated with main frame 12 in its lowered operating position as shown in FIGS. 1, 1a, 2, 2a, 4 and 6. Self-leveling mechanism 84 is disengaged at this time such that implement 10 is in its floating hitch mode with hitch 20 free to pivot relative to main frame 12 about the horizontal transverse axis defined by pivots 22. Latch cylinder 116 is fully retracted at this time so that latch 88 is deactuated with strut 108 located at the lower end of upstanding lever 98. Consequently, as implement 10 flexes about pivots 22 as the implement and tractor experience changes in terrain relative to one another as shown in FIGS. 1 and 2, lever 98 is free to swing fore-and-aft between the limits defined by rollers 112,114 so as to accommodate the floating hitch action. This enables tillage tools 28 throughout main frame 12 to be maintained at the same depth inasmuch as main frame 12 remains level.

When the end of a row is reached, or when the implement is to be readied for over-the-road travel, it is a simple matter to engage and utilize self-leveling mechanism 84, as illustrated in FIGS. 6–8. In FIG. 6, latch cylinder 116 is in its deactuated, fully retracted condition, causing strut 108 to be at the lower end of lever 98. By then actuating cylinder 116, strut 108 is lifted about its pivotal connection 110 until limit rollers 112,114 are located at the wide portion 104 of lever 98 as shown in FIGS. 7 and 7a. It is to be noted that although FIG. 6 illustrates the implement in a level condition throughout its entire length, the machine need not be in this condition before self-leveling mechanism 84 can be engaged.

Once latch 88 is actuated, self-leveling mechanism 84 is effectively engaged. Thus, as wheel cylinders 58 then extend to raise the main frame 12 to its transport position, the downward swinging motion of wheel arms 38 and rocker bar 50 is translated into forward motion of link 96 through bell crank 92. However, inasmuch as lever 98 is locked in its immobilized condition at this time, such forward motion of link 96 is transmitted down through lever 98 to hitch 20. This reaction causes the implement to buckle about pivots 22 as illustrated in FIG. 8 as the main frame 12 remains level. It will be noted that as the rear end of hitch 20 rises during such leveling action, such movement is permitted by virtue of a transverse pivotal connection between hitch coupling 24 and hitch 20. With the implement in the fully raised transport position of FIG. 8, tools 28 throughout all regions of main frame 12 are raised up into a position providing excellent ground clearance.

In order to return the implement to its field operating position, wheel cylinders 58 are retracted, causing the main frame 12 to be lowered relative to transport wheels 30. Inasmuch as lever 98 remains locked at this time, self-leveling mechanism 84 continues to function and maintains the main frame 12 level until it is fully lowered into the operating position. Once wheel cylinders 58 have fully retracted, latch cylinder 116 retracts, effectively deactuating latch 88 by lowering strut 108 until limit rollers 112,114 are at the bottom end of lever 98 adjacent narrow portion 106. At that time, the floating hitch mode is re-established such that hitch 20 and main frame 12 are once again able to flex freely relative to one another about the transverse axis defined by pivots 22.

It is to be noted that gauge wheel assemblies 32 are on the ground only when main frame 12 is in its lowered operating position. As wheel cylinders 58 are extended during a lift cycle so as to effectively lower transport wheel assemblies 30 relative to frame 12, gauge wheel assemblies 32 do not correspondingly lower. Instead, they remain set at the height established by ratchet jack 78 of depth control mechanism 76. Consequently, when main frame 12 is in its transport position of FIGS. 5 and 8, gauge wheel assemblies 32 are fully off the ground. This greatly facilitates roading of implement 10, since the caster wheels 68 of gauge wheel assemblies 32 tend to swivel and shake when engaged with the ground at roading speeds.

Furthermore, it will be noted that gauge wheel assemblies 32 are raised and lowered relative to main frame 12 only during those infrequent occasions when depth adjustment is desired by manipulating the ratchet jack 78. Consequently, the useful life of the various movable components making up the wheel assemblies 32 is greatly prolonged and reliability is increased. Notwithstanding the forgoing, simultaneous depth adjustment of both gauge wheel assemblies 32 and transport wheel assemblies 30 is accomplished by simply manipulating the ratchet jacks 78.

The preferred forms of the invention described above are to be used as illustration only, and should not be utilized in a limiting sense in interpreting the scope of the present invention. Obvious modifications to the exemplary embodiments, as herein above set forth, could be readily made by those skilled in the art without departing from the spirit of the present invention.

The inventor(s) hereby states their intent to rely on the Doctrine of Equivalents to determine and assess the reasonably fair scope of the present invention as pertains to any apparatus not materially departing from but outside the literal scope of the invention as set forth in the following claims.

What is claimed is:

1. In a farm implement, the improvement comprising:

a frame;

a rear transport wheel assembly disposed to support the rear of the frame in a lowered, operating position, said transport wheel assembly being vertically adjustable relative to the frame to cause raising and lowering of the frame between said lowered, operating position and a raised transport position;

a front gauge wheel assembly disposed to support the front of the frame in said lowered, operating position and to be supported off the ground by the frame when the frame is in its raised, transport position;

a hitch at the front of the frame for coupling the implement with a towing vehicle, said hitch being pivotally connected to the frame for vertical swinging movement relative to the frame about a transverse horizontal axis; and selectively engageable self-leveling mechanism operable when disengaged to allow the implement to flex freely about said transverse axis when the frame is in said operating position and the implement encounters changes in the terrain relative to the towing vehicle and operable when engaged to operably interconnect the transport wheel assembly and the hitch in a manner to maintain the frame substantially level as it is raised and lowered between said operating and transport positions in response to vertical adjustment of the transport wheel assembly.

2. In an implement as claimed in claim 1, said self-leveling mechanism including a motion-transmitting linkage leading from the transport wheel assembly to the hitch and a selectively actuatable latch operable when actuated to lock the linkage and the hitch against movement relative to one another and operable when deactuated to allow the hitch and the frame to pivot freely relative to one another about said transverse axis.

3. In an implement as claimed in claim 2, said linkage including a lever pivotally coupled with the hitch, said latch being operable when actuated to lock the lever against pivoting movement relative to the hitch and operable when deactuated to allow the lever to pivot relative to the hitch.

4. In an implement as claimed in claim 3, said latch including a hydraulic cylinder for effecting actuation and deactuation of the latch.

5. In an implement as claimed in claim 3, said latch including a strut pivotally connected at one end to the hitch and having a pair of longitudinally spaced stops at the other end, said lever being received between said stops and having a reduced width portion that is narrower than the distance between said stops and an enlarged width portion spaced axially from the reduced width portion that substantially corresponds in width to the distance between said stops, said latch further including a device for selectively shifting the strut along the lever to place the stops either at said reduced width portion providing lost motion pivoting movement of the lever relative to the strut or at said enlarged width portion precluding pivoting movement of the lever relative to the strut.

6. In an implement as claimed in claim 5, said stops comprising rollers.

7. In an implement as claimed in claim 5, said device comprising a hydraulic piston and cylinder assembly.

8. In an implement as claimed in claim 1, said gauge wheel assembly having depth control apparatus operably coupled therewith for vertically adjusting the gauge wheel assembly relative to the frame and for holding the gauge wheel assembly in a selected position of vertical adjustment, said transport wheel assembly including a wheel arm, a lug swingable relative to said frame, and a hydraulic piston and cylinder assembly between said lug and said wheel arm, said gauge wheel assembly having a rigid link connecting the same with said lug of the transport wheel assembly whereby to hold said lug in a fixed position relative to said frame except during vertical adjustment of the gauge wheel assemblyby said depth control apparatus, at which time the lug is simultaneously adjusted with the gauge wheel assembly.

* * * * *